(12) United States Patent
Rao et al.

(10) Patent No.: US 7,657,657 B2
(45) Date of Patent: Feb. 2, 2010

(54) METHOD FOR MAINTAINING TRANSACTION INTEGRITY ACROSS MULTIPLE REMOTE ACCESS SERVERS

(75) Inventors: Goutham P. Rao, San Jose, CA (US); Eric R. Brueggemann, Cupertino, CA (US); Robert A. Rodriguez, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 748 days.

(21) Appl. No.: 11/161,656

(22) Filed: Aug. 11, 2005

(65) Prior Publication Data

US 2006/0047836 A1 Mar. 2, 2006

Related U.S. Application Data

(60) Provisional application No. 60/601,431, filed on Aug. 13, 2004.

(51) Int. Cl.
*G06F 15/16* (2006.01)
(52) U.S. Cl. ............ 709/248; 709/217; 709/219; 707/204; 714/6
(58) Field of Classification Search ............ 709/248, 709/217
See application file for complete search history.

(56) References Cited

U.S. PATENT DOCUMENTS

| | | | |
|---|---|---|---|
| 5,623,492 A | 4/1997 | Teraslinna | |
| 5,812,668 A | 9/1998 | Weber | |
| 5,819,020 A | * 10/1998 | Beeler, Jr. | 714/5 |
| 5,835,726 A | 11/1998 | Shwed et al. | |
| 5,850,446 A | 12/1998 | Berger et al. | |

(Continued)

FOREIGN PATENT DOCUMENTS

CN 1394042 1/2003

(Continued)

OTHER PUBLICATIONS

Dictionary service [online], [retrieved on Jul. 23, 2009]. Retrieved from the Internet <URL: http://dictionary.reference.com/browse/discard>.*

(Continued)

*Primary Examiner*—William C Vaughn, Jr.
*Assistant Examiner*—Adam Cooney
(74) *Attorney, Agent, or Firm*—Choate, Hall & Stewart, LLP; John D. Lanza; Christopher J. McKenna

(57) ABSTRACT

A system for providing failover redundancy in a remote access solution includes at least one application resource on a back-end server, and multiple gateway servers. One of the gateway servers is a primary gateway server while the others are failover gateway servers. Each gateway servers hosts a session with at least one executing application instance for the same application, each session on the failover gateway servers maintained in the same state as that on the primary gateway server. The primary gateway server is the only gateway servers allowed to communicate with the application resource(s). The system further includes a client device in communication over a VPN with the primary gateway server, receiving output of the application instance executing on the primary gateway server and displaying the received output on a viewer of the client device. The client device also sends input to the primary gateway server.

26 Claims, 7 Drawing Sheets

U.S. PATENT DOCUMENTS

| | | |
|---|---|---|
| 5,889,863 A | 3/1999 | Weber |
| 5,931,917 A | 8/1999 | Nguyen et al. |
| 5,943,424 A | 8/1999 | Berger et al. |
| 5,958,016 A | 9/1999 | Chang et al. |
| 5,978,840 A | 11/1999 | Nguyen et al. |
| 5,983,208 A | 11/1999 | Haller et al. |
| 5,987,132 A | 11/1999 | Rowney |
| 5,996,076 A | 11/1999 | Rowney et al. |
| 5,999,525 A | 12/1999 | Krishnaswamy et al. |
| 6,002,767 A | 12/1999 | Kramer |
| 6,023,724 A | 2/2000 | Bhatia et al. |
| 6,026,379 A | 2/2000 | Haller et al. |
| 6,026,440 A | 2/2000 | Shrader et al. |
| 6,058,250 A | 5/2000 | Harwood et al. |
| 6,061,796 A | 5/2000 | Chen et al. |
| 6,067,569 A | 5/2000 | Khaki et al. |
| 6,072,870 A | 6/2000 | Nguyen et al. |
| 6,101,543 A | 8/2000 | Alden et al. |
| 6,112,085 A | 8/2000 | Garner et al. |
| 6,119,105 A | 9/2000 | Williams |
| 6,131,120 A | 10/2000 | Reid |
| 6,163,772 A | 12/2000 | Kramer et al. |
| 6,173,325 B1 | 1/2001 | Kukreja |
| 6,178,409 B1 | 1/2001 | Weber et al. |
| 6,219,669 B1 | 4/2001 | Haff et al. |
| 6,236,652 B1 | 5/2001 | Preston et al. |
| 6,253,027 B1 | 6/2001 | Weber et al. |
| 6,253,327 B1 | 6/2001 | Zhang et al. |
| 6,272,556 B1 | 8/2001 | Gish |
| 6,282,172 B1 | 8/2001 | Robles et al. |
| 6,289,382 B1 | 9/2001 | Bowman-Amuah |
| 6,304,915 B1 | 10/2001 | Nguyen et al. |
| 6,308,273 B1 | 10/2001 | Goertzel et al. |
| 6,321,337 B1 | 11/2001 | Reshef et al. |
| 6,324,525 B1 | 11/2001 | Kramer et al. |
| 6,327,242 B1 | 12/2001 | Amicangioli et al. |
| 6,332,163 B1 | 12/2001 | Bowman-Amuah |
| 6,333,931 B1 | 12/2001 | LaPier et al. |
| 6,339,832 B1 | 1/2002 | Bowman-Amuah |
| 6,345,239 B1 | 2/2002 | Bowman-Amuah |
| 6,363,363 B1 | 3/2002 | Haller et al. |
| 6,373,950 B1 | 4/2002 | Rowney |
| 6,412,000 B1 | 6/2002 | Riddle et al. |
| 6,427,132 B1 | 7/2002 | Bowman-Amuah |
| 6,434,568 B1 | 8/2002 | Bowman-Amuah |
| 6,434,618 B1 | 8/2002 | Cohen et al. |
| 6,434,628 B1 | 8/2002 | Bowman-Amuah |
| 6,438,594 B1 | 8/2002 | Bowman-Amuah |
| 6,442,571 B1 | 8/2002 | Haff et al. |
| 6,442,748 B1 | 8/2002 | Bowman-Amuah |
| 6,452,915 B1 | 9/2002 | Jorgensen |
| 6,452,923 B1 | 9/2002 | Gersziberg et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,484,206 B2 | 11/2002 | Crump et al. |
| 6,496,481 B1 | 12/2002 | Wu et al. |
| 6,496,776 B1 | 12/2002 | Blumberg et al. |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,553,377 B1 | 4/2003 | Eschelbeck et al. |
| 6,571,282 B1 | 5/2003 | Bowman-Amuah |
| 6,574,688 B1 | 6/2003 | Dale et al. |
| 6,578,068 B1 | 6/2003 | Bowman-Amuah |
| 6,590,588 B2 | 7/2003 | Lincke et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,662,221 B1 | 12/2003 | Gonda et al. |
| 6,671,818 B1 | 12/2003 | Mikurak |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,700,902 B1 | 3/2004 | Meyer |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,760,748 B1 | 7/2004 | Hakim |
| 6,766,373 B1 | 7/2004 | Beadle et al. |
| 6,792,615 B1 | 9/2004 | Rowe et al. |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,894,981 B1 | 5/2005 | Coile et al. |
| 6,904,449 B1 | 6/2005 | Quinones |
| 6,907,546 B1 | 6/2005 | Haswell et al. |
| 6,918,113 B2 | 7/2005 | Patel et al. |
| 6,920,502 B2 | 7/2005 | Araujo et al. |
| 6,944,279 B2 | 9/2005 | Elsey et al. |
| 6,954,736 B2 | 10/2005 | Menninger et al. |
| 6,954,877 B2 * | 10/2005 | Earl et al. .................... 714/13 |
| 6,957,186 B1 | 10/2005 | Guheen et al. |
| 6,980,962 B1 | 12/2005 | Arganbright et al. |
| 6,990,480 B1 | 1/2006 | Burt |
| 6,996,628 B2 | 2/2006 | Keane et al. |
| 6,996,631 B1 | 2/2006 | Aiken, Jr. et al. |
| 7,010,300 B1 | 3/2006 | Jones et al. |
| 7,013,290 B2 | 3/2006 | Ananian et al. |
| 7,023,979 B1 | 4/2006 | Wu et al. |
| 7,026,954 B2 | 4/2006 | Slemmer et al. |
| 7,028,333 B2 | 4/2006 | Tuomenoksa et al. |
| 7,028,334 B2 | 4/2006 | Tuomenoksa |
| 7,036,142 B1 | 4/2006 | Zhang et al. |
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |

| | | |
|---|---|---|
| 7,047,279 B1 | 5/2006 | Beams et al. |
| 7,047,424 B2 | 5/2006 | Bendinelli et al. |
| 7,054,837 B2 | 5/2006 | Hoffman et al. |
| 7,054,944 B2 | 5/2006 | Tang et al. |
| 7,072,665 B1 | 7/2006 | Blumberg et al. |
| 7,072,843 B2 | 7/2006 | Menninger et al. |
| 7,080,041 B2 | 7/2006 | Nagel |
| 7,085,854 B2 | 8/2006 | Keane et al. |
| 7,092,370 B2 | 8/2006 | Jiang et al. |
| 7,096,009 B2 | 8/2006 | Mousseau et al. |
| 7,100,195 B1 | 8/2006 | Underwood |
| 7,103,068 B1 | 9/2006 | Gardner et al. |
| 7,107,285 B2 | 9/2006 | von Kaenel et al. |
| 7,113,779 B1 | 9/2006 | Fujisaki et al. |
| 7,114,180 B1 | 9/2006 | DeCaprio |
| 7,120,596 B2 | 10/2006 | Hoffman et al. |
| 7,120,690 B1 * | 10/2006 | Krishnan et al. ............ 709/225 |
| 7,124,101 B1 | 10/2006 | Mikurak |
| 7,124,442 B2 | 10/2006 | Nash-Putnam |
| 7,130,792 B2 | 10/2006 | Tokieda et al. |
| 7,130,807 B1 | 10/2006 | Mikurak |
| 7,135,991 B2 | 11/2006 | Slemmer et al. |
| 7,136,645 B2 | 11/2006 | Hanson et al. |
| 7,140,044 B2 | 11/2006 | Redlich et al. |
| 7,143,153 B1 | 11/2006 | Black et al. |
| 7,146,644 B2 | 12/2006 | Redlich et al. |
| 7,149,698 B2 | 12/2006 | Guheen et al. |
| 7,152,047 B1 | 12/2006 | Nagel |
| 7,152,092 B2 | 12/2006 | Beams et al. |
| 7,165,041 B1 | 1/2007 | Guheen et al. |
| 7,171,379 B2 | 1/2007 | Menninger et al. |
| 7,181,766 B2 | 2/2007 | Bendinelli et al. |
| 7,188,273 B2 * | 3/2007 | Allen et al. ............. 714/6 |
| 7,191,252 B2 | 3/2007 | Redlich et al. |
| 7,216,173 B2 | 5/2007 | Clayton et al. |
| 7,221,660 B1 | 5/2007 | Simonson et al. |
| 7,225,244 B2 | 5/2007 | Reynolds et al. |
| 7,228,459 B2 * | 6/2007 | Jiang et al. ............. 714/43 |
| 7,260,617 B2 * | 8/2007 | Bazinet et al. ............. 709/219 |
| 7,321,906 B2 * | 1/2008 | Green ............. 707/204 |
| 7,340,772 B2 | 3/2008 | Panasyuk et al. |
| 7,353,533 B2 | 4/2008 | Wright et al. |
| 7,363,347 B2 | 4/2008 | Thomas |
| 2001/0037387 A1 | 11/2001 | Gilde et al. |
| 2001/0047406 A1 | 11/2001 | Araujo et al. |
| 2001/0049717 A1 * | 12/2001 | Freeman et al. ............. 709/203 |
| 2002/0016827 A1 | 2/2002 | McCabe et al. |
| 2002/0023210 A1 | 2/2002 | Tuomenoksa et al. |
| 2002/0029285 A1 | 3/2002 | Collins |
| 2002/0032725 A1 | 3/2002 | Araujo et al. |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0071438 A1 | 6/2002 | Singh |
| 2002/0073061 A1 | 6/2002 | Collins |
| 2002/0081971 A1 | 6/2002 | Travostino |
| 2002/0083183 A1 | 6/2002 | Pujare et al. |
| 2002/0101860 A1 | 8/2002 | Thornton et al. |
| 2002/0126675 A1 | 9/2002 | Yoshimura et al. |
| 2002/0138572 A1 | 9/2002 | Delany et al. |
| 2002/0138618 A1 | 9/2002 | Szabo |
| 2002/0152373 A1 | 10/2002 | Sun et al. |
| 2002/0152423 A1 | 10/2002 | McCabe |
| 2002/0176532 A1 | 11/2002 | McClelland et al. |
| 2002/0184224 A1 | 12/2002 | Haff et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0046586 A1 | 3/2003 | Bheemarasetti et al. |
| 2003/0046587 A1 | 3/2003 | Bheemarasetti et al. |
| 2003/0055962 A1 | 3/2003 | Freund et al. |
| 2003/0084162 A1 | 5/2003 | Johnson et al. |
| 2003/0084165 A1 | 5/2003 | Kjellberg et al. |
| 2003/0088698 A1 * | 5/2003 | Singh et al. ............. 709/239 |
| 2003/0088788 A1 * | 5/2003 | Yang ............. 713/201 |
| 2003/0112809 A1 | 6/2003 | Bharali et al. |
| 2003/0112823 A1 | 6/2003 | Collins et al. |
| 2003/0123481 A1 | 7/2003 | Neale et al. |
| 2003/0131263 A1 | 7/2003 | Keane et al. |
| 2003/0149899 A1 | 8/2003 | Boden et al. |
| 2003/0177389 A1 | 9/2003 | Albert et al. |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0208602 A1 | 11/2003 | Bhalla et al. |
| 2003/0212776 A1 | 11/2003 | Roberts et al. |
| 2003/0217126 A1 | 11/2003 | Polcha et al. |
| 2003/0223418 A1 | 12/2003 | Desai et al. |
| 2003/0229718 A1 | 12/2003 | Tock et al. |
| 2004/0039827 A1 | 2/2004 | Thomas et al. |
| 2004/0044521 A1 | 3/2004 | Chen et al. |
| 2004/0049515 A1 | 3/2004 | Haff et al. |
| 2004/0078772 A1 | 4/2004 | Balay et al. |
| 2004/0100976 A1 | 5/2004 | Chang et al. |
| 2004/0103438 A1 * | 5/2004 | Yan et al. ............. 725/109 |
| 2004/0107360 A1 | 6/2004 | Herrmann et al. |
| 2004/0111519 A1 | 6/2004 | Fu et al. |
| 2004/0141525 A1 | 7/2004 | Bhushan et al. |
| 2004/0143734 A1 | 7/2004 | Buer et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0258003 A1 | 12/2004 | Kokot et al. |
| 2005/0013280 A1 | 1/2005 | Buddhikot et al. |
| 2005/0044350 A1 | 2/2005 | White et al. |
| 2005/0058112 A1 | 3/2005 | Lahey et al. |
| 2005/0108517 A1 | 5/2005 | Dillon et al. |
| 2005/0125663 A1 | 6/2005 | Funk |
| 2005/0132030 A1 | 6/2005 | Hopen et al. |
| 2005/0144186 A1 | 6/2005 | Hesselink et al. |
| 2005/0144481 A1 | 6/2005 | Hopen et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0232161 A1 | 10/2005 | Maufer et al. |
| 2005/0246445 A1 | 11/2005 | Panasyuk et al. |
| 2005/0256923 A1 * | 11/2005 | Adachi ............. 709/203 |
| 2005/0262357 A1 | 11/2005 | Araujo et al. |
| 2005/0265353 A1 | 12/2005 | Sengupta et al. |
| 2005/0286466 A1 | 12/2005 | Tagg et al. |
| 2006/0005240 A1 | 1/2006 | Sundarrajan et al. |
| 2006/0185010 A1 | 8/2006 | Sultan |
| 2006/0225130 A1 | 10/2006 | Chen et al. |
| 2007/0130334 A1 | 6/2007 | Carley |
| 2007/0233910 A1 | 10/2007 | Paley et al. |

FOREIGN PATENT DOCUMENTS

| | | |
|---|---|---|
| EP | 1045553 | 10/2000 |
| EP | 1134942 | 9/2001 |
| EP | 1427133 | 6/2004 |
| EP | 1432209 | 6/2004 |
| JP | 07302237 | 11/1995 |
| WO | WO-03/083692 | 10/2003 |
| WO | WO-2005048106 | 5/2005 |
| WO | WO-2006/012612 | 2/2006 |

WO WO-2006/020823 2/2006

OTHER PUBLICATIONS

EP Communication for EP Patent Application No. 07007414.1 dated Jun. 5, 2008. (6 pages).
EP Communication for European Patent Application No. 05776653.7 dated Oct. 5, 2007. (7 pages).
EP Communication from EP Patent Application No. 05 785 297.2, dated May 18, 2007, 2 pages.
European Search Report for European Patent Application No. EP 07007414 dated Jul. 16, 2007. (2 pages).
Final Office Action dated Dec. 9, 2008 pertaining to U.S Appl. No. 11/187,562. 15 pages.
Final Office Action dated Dec. 23, 2008 pertaining to U.S Appl. No. 11/188,279. 12 pages.
International Search Report for PCT/US2005/022884, mailed on Jul. 8, 2008.
International Search Report for PCT/US2005/026300, Mailing date: Dec. 16, 2005. 3 pages.
International Search Report for PCT/US2005/028663, Mailing date: Nov. 16, 2005. 3 pages.
International Search Report to PCT/US04/37918, mailed on Apr. 27, 2008, 1 page.
International Search Report to PCT/US2005/026296, mailed on Jan. 31, 2006, 5 pgs.
Ipswitch Inc., WSFTP User's Guide, Chapter 8: Security, Jun. 25, 2003, 8 pages.
Non Final Office Action dated Jan. 24, 2008 pertaining to U.S Appl. No. 10/988,004. 6 pages.
Non Final Office Action dated Jun. 10, 2008 pertaining to U.S Appl. No. 11/187,562. 15 pages.
Non Final Office Action dated Jun. 23, 2008 pertaining to U.S Appl. No. 11/039,946. (14 pages).
Non Final Office Action dated Aug. 5, 2008 pertaining to U.S Appl. No. 11/161,091. 17 pages.
Non Final Office Action dated Aug. 20, 2008 pertaining to U.S Appl. No. 11/161,092. (16 pages).
Non Final Office Action dated Dec. 11, 2007 pertaining to U.S Appl. No. 10/683,881. 10 pages.
Non Final Office Action dated Jun. 26, 2008 pertaining to U.S Appl. No. 11/188,279. 12 pages.
Non Final Office Action dated Aug. 15, 2008 pertaining to U.S Appl. No. 11/161,090 25 pages.
Notice of Allowance dated Sep. 18, 2008. USPTO U.S. Appl. No. 10/988,004 5 pgs.
Office Action dated Sep. 26, 2008 from Chinese Application No. 200480040249.X corresponding to U.S Appl. No. 10/988,004 22 pgs.
Written Opinion of the International Searching Authority to PCT/US04/37918, mailed on Apr. 27, 2005, 7 pages.
Written Opinion of the International Searching Authority to PCT/US2005/026296, mailed on Jan. 31, 2006.
Written Opinion of the International Searching Authority to PCT/US2005/026300; Mailed on Dec. 16, 2005, 7 pages.
Written Opinion of the International Searching Authority to PCT/US2005/028663; Mailed on Nov. 16, 2005, 7 pages.
Written Opinion of the ISA for PCT/US2005/022884, mailed on Jul. 8, 2008.
Advisory Action for U.S. Appl. No. 11/161,091 dated May 6, 2009.
Advisory Action for U.S. Appl. No. 11/161,092 dated Apr. 24, 2009.
Exam Report for AU appln 2005266943 dated May 14, 2009.
Exam Report for AU appln 2005266945 dated Jul. 21, 2009.
Exam Report for AU appLn 2005272779 dated Apr. 23, 2009.
Exam Report for EP appln 05776653.7 dated Apr. 20, 2009.
Notice of Allowance for U.S. Appl. No. 11/161,092 dated Jun. 11, 2009.
Office Action for U.S. Appl. No. 11/161,090 dated May 28, 2009.
Office Action for U.S. Appl. No. 11/161,093 dated Jun. 19, 2009.

* cited by examiner

METHOD FOR MAINTAINING TRANSACTION INTEGRITY ACROSS MULTIPLE REMOTE ACCESS SERVERS

CROSS REFERENCE TO RELATED APPLICATIONS

This application claims the benefit of U.S. Provisional Patent Application No. 60/601,431, entitled "System And Method For Assuring Redundancy In Remote Access Solutions", filed Aug. 13, 2004.

FIELD OF THE INVENTION

The illustrative embodiment of the present invention relates generally to remote access servers, and more particularly to a system and method for maintaining transaction integrity in a remote access solution during failure.

BACKGROUND OF THE INVENTION

Remote access solutions enable workers away from a company to securely access the company network. Through the use of IPSec VPNs or SSL VPNs remote users are able to access a company network in a secure manner. Access from a client device may be routed through one or more gateway servers which are utilized in maintaining the remote access session. With conventional remote access solutions, failure in a gateway server maintaining the remote access session results in a terminated session and lost data.

To address the issue of gateway server failure, a number of different conventional techniques have been applied in an attempt to ensure redundancy and full availability of system resources in the event of hardware or software failure. In an active/passive server arrangement an active server hosts a number of executing processes and applications. The active server may be hosting an IPSec VPN-based session or an SSL based session. One or more other servers are designated as backup or "failover" servers. The failover servers include the capability of executing the same applications and processes that are executing on the active server but the failover server(s) do not execute the applications and processes until notified of a problem with the active server. The failover servers are known as "passive" servers in this arrangement because they may be thought of as quietly waiting to execute the applications and processes that are being executed on the active server while the backup server is operating in failover mode. Once notified of a problem with the active server, one of the failover servers is selected as the new active server, receives the last saved state/session information from the formerly "active" server and proceeds to execute in the manner in which the previous active server was executing prior to the detected failure/problem. Unfortunately, the active/passive arrangement results in a loss of data during the transition from the first active server to the newly designated active server.

It will be appreciated that the failover servers may be located on either the same or a separate physical node. An implementation that includes a failover server on the same physical node runs the risk that the failure causing the failover is associated with a physical node element that will also impact the failover server. Locating the failover server on a separate physical node that includes separate physical resources (e.g. memory, disk arrays, motherboard, etc.) lowers the risk of a single physical element causing both the active and failover servers to fail but increases the cost of the overall system in both hardware acquisition and management.

Another technique to provide redundancy amongst servers is to arrange servers in an active/active arrangement. In an active/active arrangement, both the active and passive failover servers are executing the same set of applications and processes. When the first active server goes down, the second active server allocates resources to those application instances and processes that were previously being handled by the failed server.

Unfortunately, neither the active/passive nor the active/active failover server arrangement lend themselves to preserving session state for a remote access session. Neither conventional failover implementation allows a remote session state to be mirrored in a failover server such that the failover server may be transitioned to without terminating the existing session and losing session data. It would be desirable to be able to preserve an existing remote session and its session data in the event of a failure affecting an active server hosting the remote session.

BRIEF SUMMARY OF THE INVENTION

The illustrative embodiment of the present invention allows a remote session state to be synchronized between a primary gateway server and active failover servers. Incoming data sent from the client device to the primary gateway server hosting the remote session is transmitted to the active failover servers which are hosting mirror sessions. Acknowledgements of the receipt of the incoming data are not sent back to the client device from the primary gateway device until the distribution of the data to the failover servers has been confirmed. Requests to application resources from the remote session on the primary gateway server are allowed while those from the mirror sessions running on the failover servers are intercepted and discarded so as to prevent application resource conflicts. Data received in response to a request from the primary gateway server to an application resource running on back-end servers is similarly mirrored to the failover servers before being transmitted to the client device. The response is forwarded to the client device from the primary gateway server while being intercepted from the mirror sessions running on the failover servers. In the event of a failure affecting the primary gateway server, one of the failover servers hosting the mirrored sessions is elected as the primary active server and its permissions are changed to allow the newly elected primary gateway to communicate with the client device and with the application resources.

In one aspect of the present invention, a system for providing failover redundancy in a remote access solution includes at least one application resource on a back-end server. The system further includes multiple gateway servers. One of the multiple gateway servers is designated as a primary gateway server while the other servers are designated as failover gateway servers. Each of the multiple gateway servers hosts a session with at least one executing application instance for the same application with each of the sessions on the failover gateway servers being maintained in the same state as the session on the primary gateway server. The primary gateway server is the only one of the gateway servers that is allowed to communicate with the application resource(s). The system further includes a client device that is in communication over a VPN with the primary gateway server. The client device receives output of the application instance executing in the session on the primary gateway server over the VPN. The client device also sends input to the primary gateway server over the VPN. The received output is displayed on a viewer by the client device.

In another aspect of the present invention, a method for providing failover redundancy in a remote access solution, includes the step of providing at least one application resource on a back-end server. The method further includes the step of designating one of multiple gateway servers as a primary gateway server while designating the other servers as failover gateway servers. Each of the gateway servers hosts a session with at least one executing application instance for the same application. The primary gateway server is the only one of the multiple gateway servers that is allowed to communicate with the at least one application resource. The method further includes the step of maintaining the sessions on the failover gateway servers in the same state as the session on the primary gateway server. Additionally, the method includes the step of receiving at a client device in communication over a VPN with the primary gateway server the output of the at least one application instance executing in the session on the primary gateway server with the received output being displayed on a viewer by the client device.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

The illustrative embodiment of the present invention provides the ability to mirror session state from an active primary gateway server to an active failover server. By copying all of the received input from the client and all responses received from application resources, the failover sessions are able to be maintained in the same state as the session on the primary gateway server with which the client device is communicating. In the event of failure, the existing session can be transitioned to a failover server (which becomes the primary gateway server) without disrupting the session and with minimal loss of data.

Figure 1:
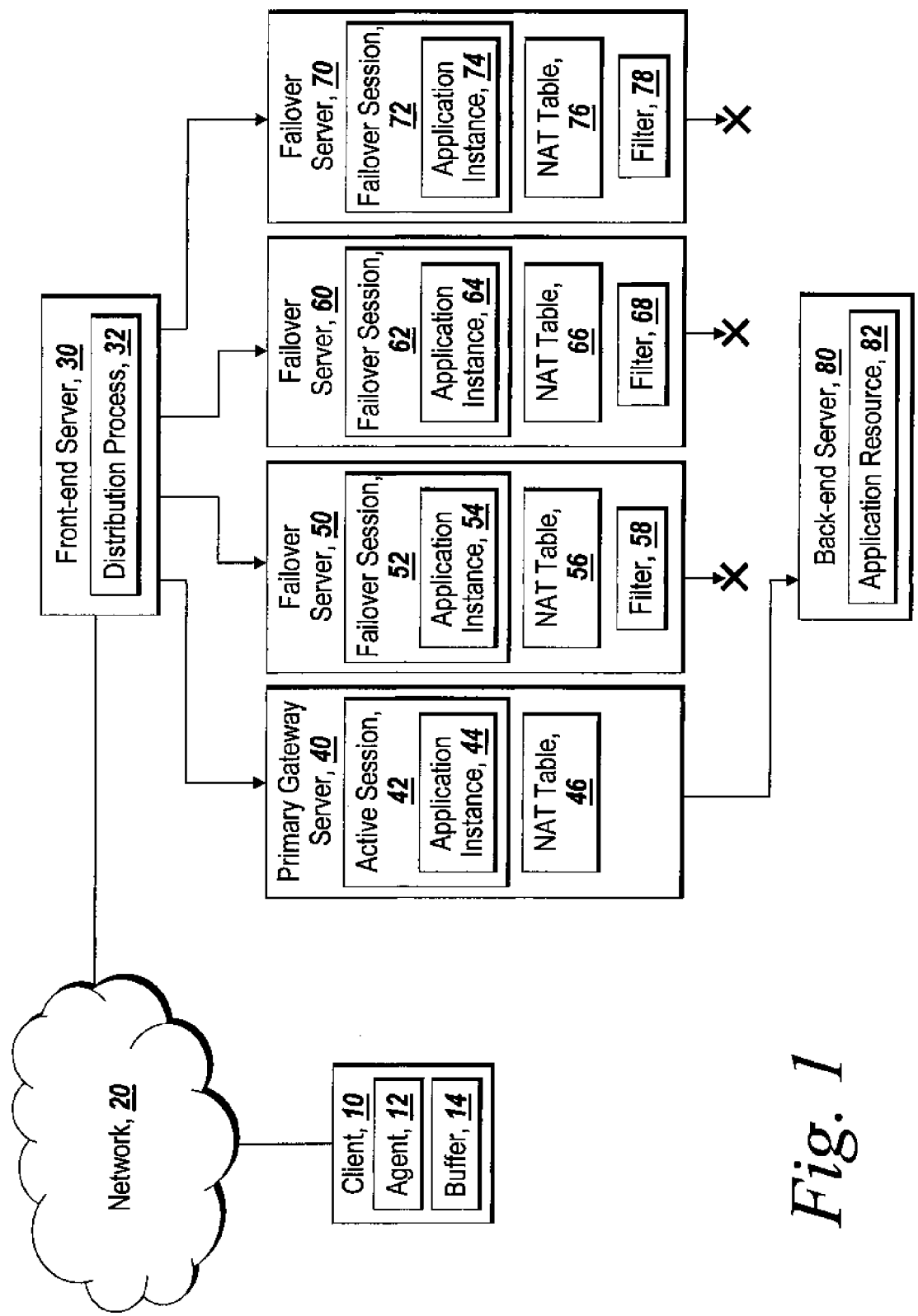
FIG. 1 depicts an environment suitable for practicing the illustrative embodiment of the present invention utilizing a front-end server in front of multiple gateway servers.

FIG. 1 depicts an environment suitable for practicing the illustrative embodiment of the present invention. A client 10 that includes an agent 12 communicates over a network 20 with a front end server 30. The front end server 30 includes a distribution process 32. The distribution process 32 copies and distributes data received from the client device to an active remote session 42 on a primary gateway server 40 and mirror failover sessions 52, 62 and 72 on failover servers 50, 60 and 70. Application instances 44, 54, 64 and 74 running on the respective active and failover sessions 42, 52, 62 and 72 may request data from an application resource 82 hosted by a back end server 80. Responses from the application resource 82 to an executing application instance's request for data are returned to the distribution process 32 on the front-end server 30 for distribution to the active session 42 and failover sessions 52, 62 and 72.

Referring now to FIG. 1 in more detail, the client 10 may be communicating over the network 20 by establishing an IPSEC VPN or an SSL VPN to a remote session (active session 42) established on the primary gateway server 40. The client may include a buffer 14 in which the agent 12 buffers a copy of the data sent to the primary gateway server 40 until receiving an acknowledgement from the primary gateway server. The network 20 may be the Internet, a local area network (LAN), a wide area network (WAN), an extranet, an intranet, wireless network, satellite network, or some other type of network capable of allowing the client 10 to communicate with the active session 42 on the primary gateway server 40. The primary gateway server 40, and failover servers 50, 60 and 70 may include Network Address Translation (NAT) tables 46, 56, 66 and 76 allowing the servers to perform NAT for an IP address assigned to the client 10 during the establishment of the remote session by the primary VPN server. As noted above, active session 42, and failover sessions 52, 62 and 72 may include executing application instances 44, 54, 64 and 74 which request data from an application resource 82 on a back-end server 80. As will be explained in greater detail below, failover servers 50, 60 and 70 also include filters 56, 66 and 76 which filter and discard requests to the application resource 82 from the failover sessions 52, 62, and 72 while the failover servers are acting in failover mode. Responses from the application resource 82 to the request from an executing application instance 44 in active session 42 are routed to the distribution process 32 for distribution to the active session and failover sessions 52, 62 and 72. Those skilled in the art will recognize that the location of the distribution process 32 may vary within the scope of the present invention in that it may be located in different network accessible locations other than on the front-end server and still perform the functions described herein.

Figure 2A:
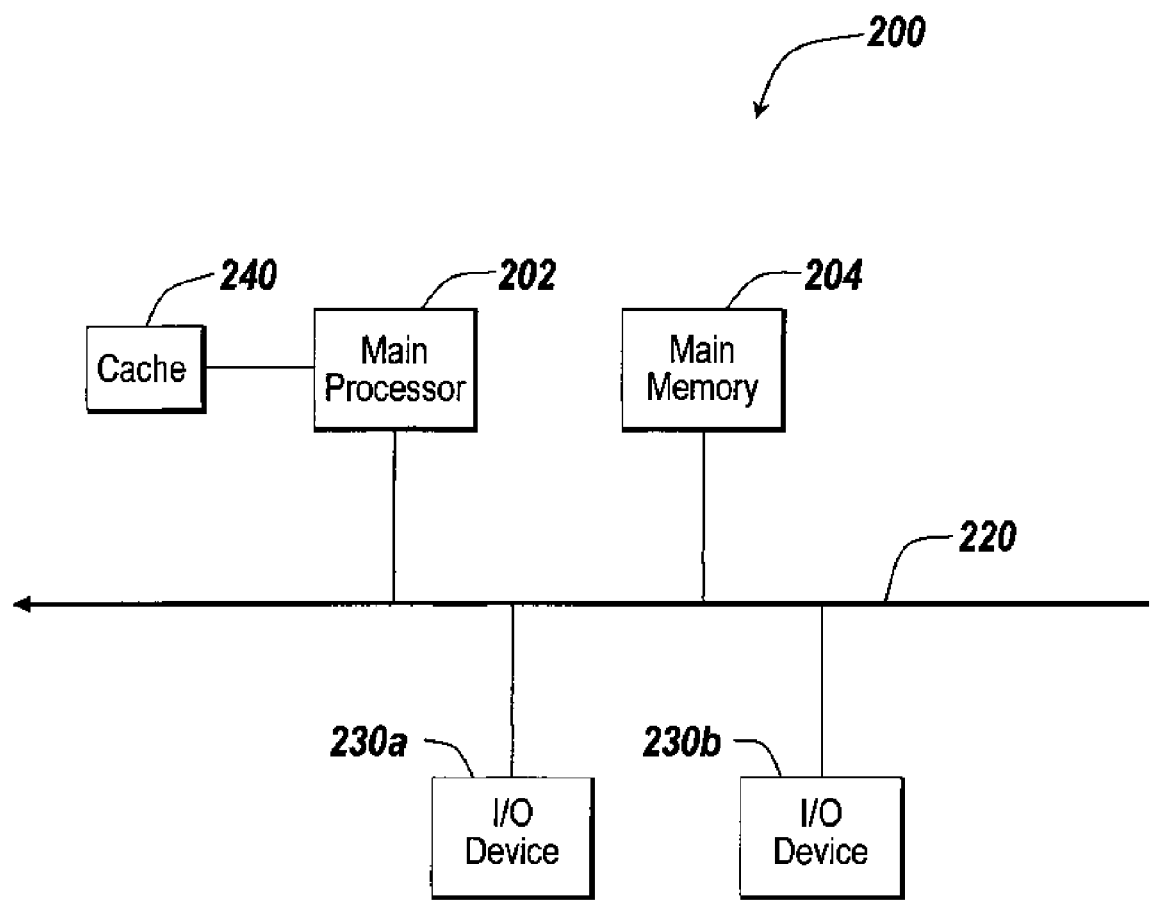
FIG. 2A is a block diagram depicting a typical computer useful in the present invention.
Figure 2B:
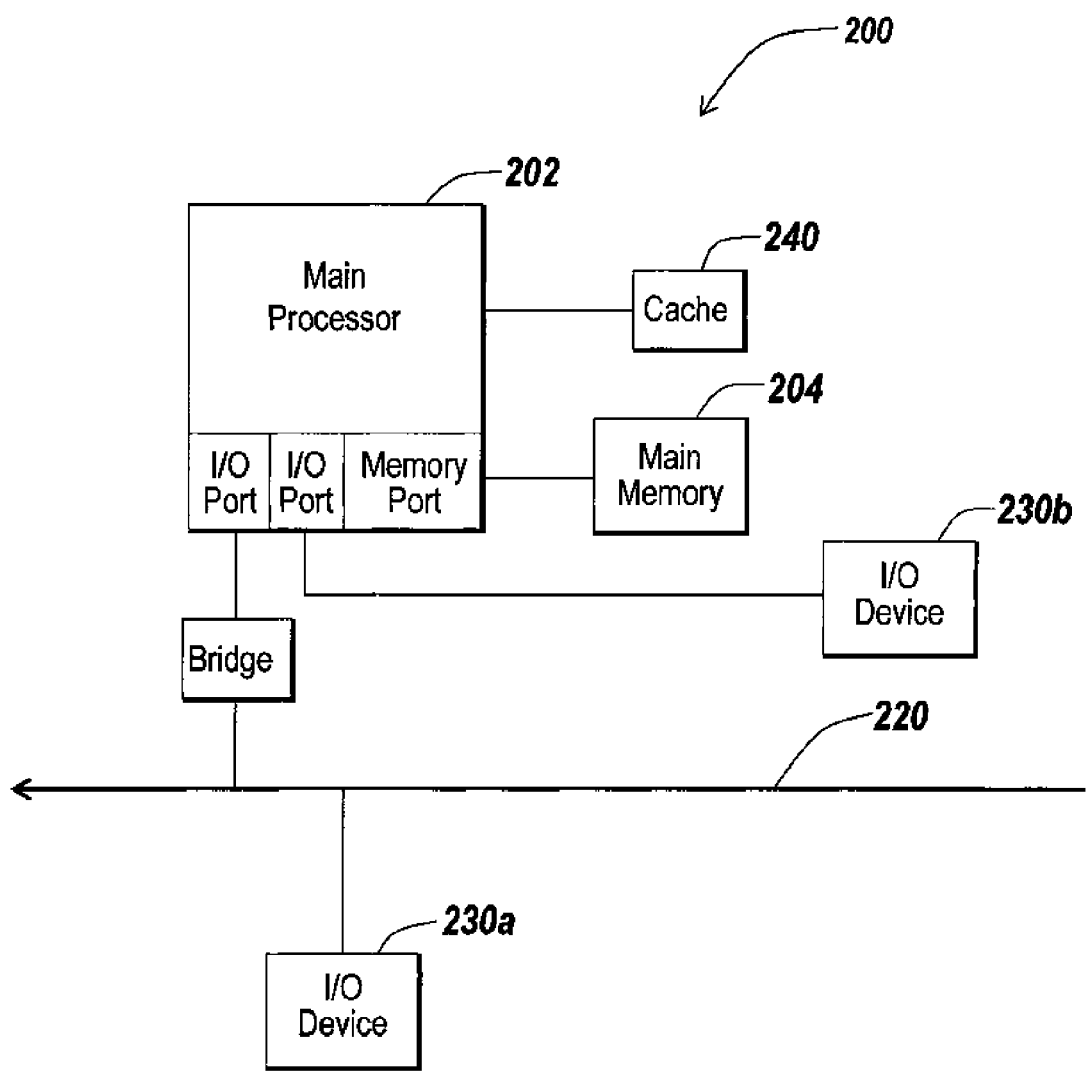
FIG. 2B depicts an embodiment of the computer system in which the processor communicates directly with main memory via a memory port.

Still referring to FIG. 1, and in more detail, in many embodiments, the client 10, front-end server 30 and the back-end server 80 are provided as personal computers or computer servers, of the sort manufactured by the Hewlett-Packard Corporation of Palo Alto, Calif. or the Dell Corporation of Round Rock, Tex. FIGS. 2A and 2B depict block diagrams of a typical computer 200 useful as the client 10, front-end server 30 and the back-end server 80 in those embodiments. As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local buses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

General-purpose desktop computers of the sort depicted in FIGS. 2A and 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the client 10 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client 10 is mobile, it may be a personal digital assistant (PDA) operating under control of the PalmOS operating system, such as the Tungsten W, the VII, the VIIx, the i705, all of which are manufactured by palmone, Inc. of Milpitas, California. In further embodiments, the client device 10 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, California, or the Toshiba PocketPC e405, manufactured by Toshiba America, Inc. of New York, N.Y. In still other embodiments the client device is a combination PDA/telephone device such as the Treo 180, Treo 270 or Treo 600, all of which are manufactured by palmone, Inc. of Milpitas, Calif. In still further embodiment, the client device 10 is a cellular telephone that operates under control of the PocketPC operating system, such as the MPx200, manufactured by Motorola Corp.

Figure 3:
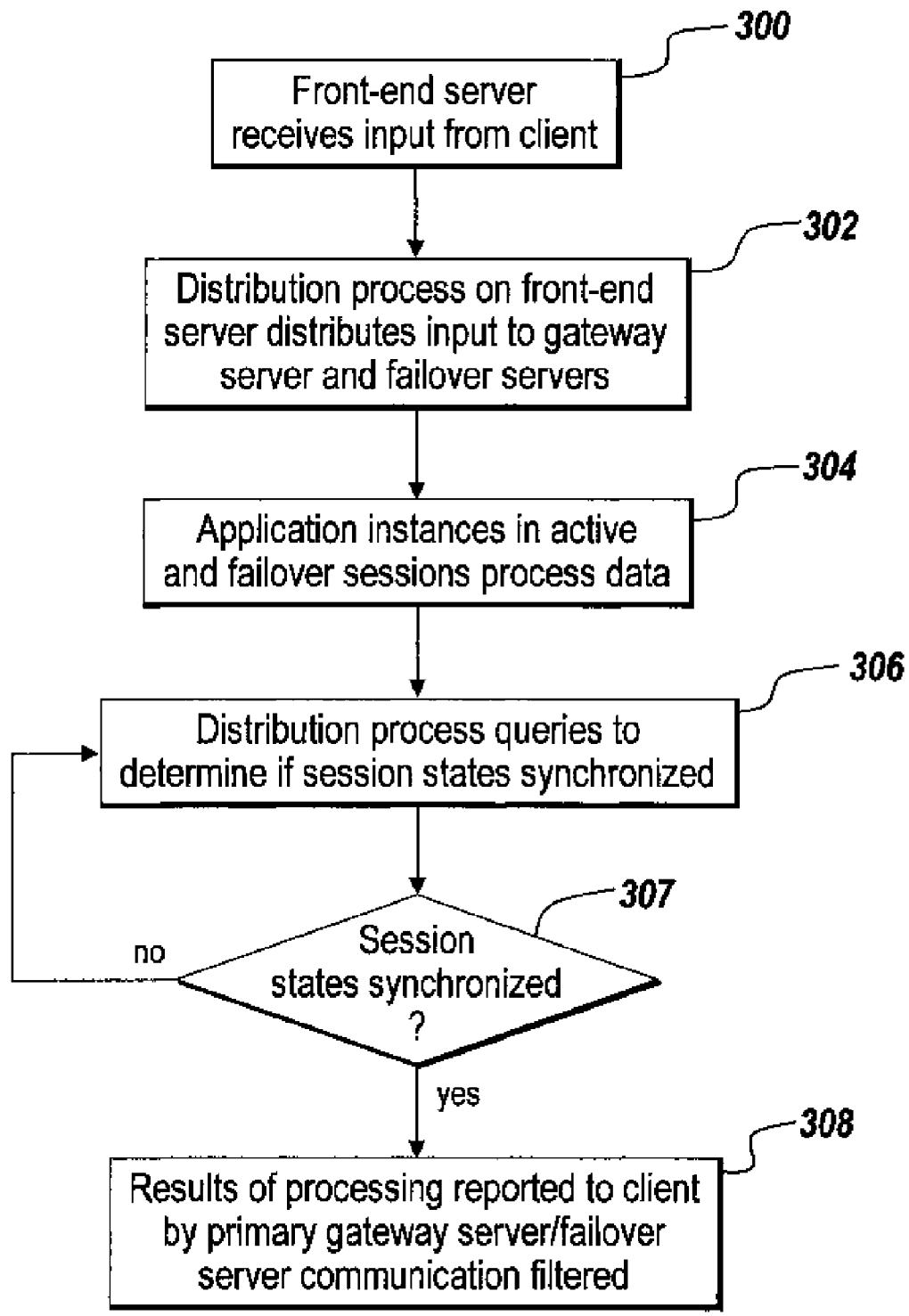
FIG. 3 is a flowchart of the sequence of steps followed by the illustrative embodiment of the present invention to mirror data directed to the active session on the primary gateway server to the failover sessions on the failover servers.

The functions performed by the components depicted in the architecture displayed in FIG. 1 may be further explained with reference to FIG. 3. FIG. 3 is a flowchart of the sequence of steps followed by the present invention to mirror data directed to the active session on the primary gateway server to the failover sessions on the failover servers. Following the establishment of the initial remote active session 42 on the primary gateway server 40 (following authentication of the client 10) and the establishment of the corresponding failover sessions 52, 62 and 72 on the failover servers 50, 60 and 70, the front-end server 30 receives input from the client directed to the active session (step 300). The distribution process 32 on the front-end server 30 copies and distributes the input data to the active session 42 and failover sessions 52, 62 and 72 (step 302). The application instances in the active 42 and failover sessions 52, 62 and 72 then process the received data (step 304).

The distribution process 32 then queries the active and failover sessions 42, 52, 62 and 72 to determine if the session states are synchronized (step 306). The verification of synchronization is necessary due to possible variances in processing speed amongst the servers and latency delays in the network. In alternate implementations, the primary gateway server 40 and the failover servers 40, 50 and 60 are configured to report their session state to the distribution process 32 without first being queried. In another implementation, a different process other than the distribution process has the responsibility of verifying the synchronization of the states of the sessions 42, 52, 62 and 72. If the session states are determined not to be synchronized (step 307), a delay is implemented pending a further query from the distribution process to determine the synchronization status (step 306). If the session states are synchronized (step 307), the results of the processing performed by the application instance 44 in the active session 42 on the primary gateway server 40 are reported to the client (step 308). Attempts by application instances in the failover sessions 52, 62 and 72 are filtered by the respective filters 46, 56 and 66 on the network stack and the packets discarded.

Figure 4:
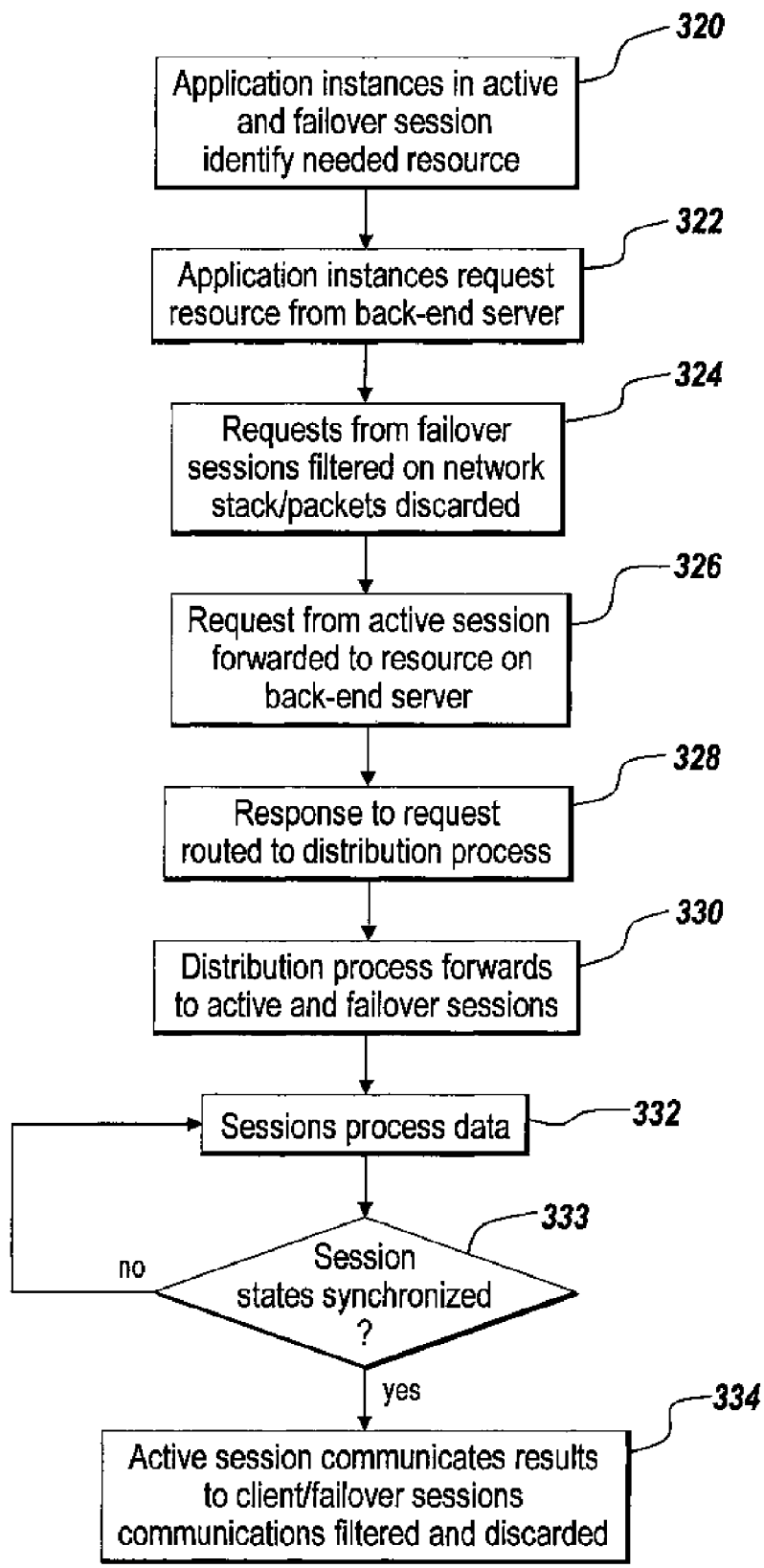
FIG. 4 is a flowchart of the sequence of steps followed by the illustrative embodiment of the present invention to request data from an application resource and mirror the response to the failover sessions.

A similar process is performed to keep the active and failover session states synchronized during a request by an application instance executing in a session for an application resource. FIG. 4 is a flowchart of the sequence of steps followed by the illustrative embodiment of the present invention to request data from an application resource and mirror the response to the failover sessions. The sequence begins when the application instance 44 in the active session 42 (and the corresponding application instances 54, 64 and 74 in the failover sessions 52, 62 and 72) identify a needed application resource (step 320). The application instances 44, 54, 64 and 74 from all of the sessions then request the application resource 82 from the back-end server 80 (step 322). The requests originating from the application instances 54, 64 and 74 in the failover sessions 52, 62 and 72 are filtered by filters 58, 68 and 78 on the network stack of the respective failover servers 50, 60 and 70. The filtered packets are discarded (step 324). The request from the active session 42 is forwarded to the application resource 82 on the back-end server 80 (step 326). The response to the request is routed to the distribution process 32 on the front-end server (step 328). In one implementation, the response is sent to the primary gateway server 40 which is hosting the active session 42 first and is forwarded to the distribution process 32. In another implementation, a separate distribution process different from the one used to accept input data from the client may be used to distribute application resource responses.

Continuing with FIG. 4, following the receipt of the response from the application resource, the distribution process forwards the response data to the active and failover sessions 42, 52, 62 and 72 (step 330). The application instances 44, 54, 64 and 74 in the active session 42 and failover sessions 52, 62 and 72 then process the resource data (step 332). As with the data received from the client, a query is made to determine if the session states are synchronized (step 333). If the states are not synchronized the query is repeated until an affirmative response is received. Once the session states are synchronized, the application instance in the active session 42 communicates the results of its data processing to the client 10. The application instances 54, 64 and 74 on the failover servers also attempt to communicate their results to the client 10, but the packets are intercepted and discarded by the network filters 58, 68 and 78 on the respective failover servers 50, 60 and 70 (step 334).

Figure 5:
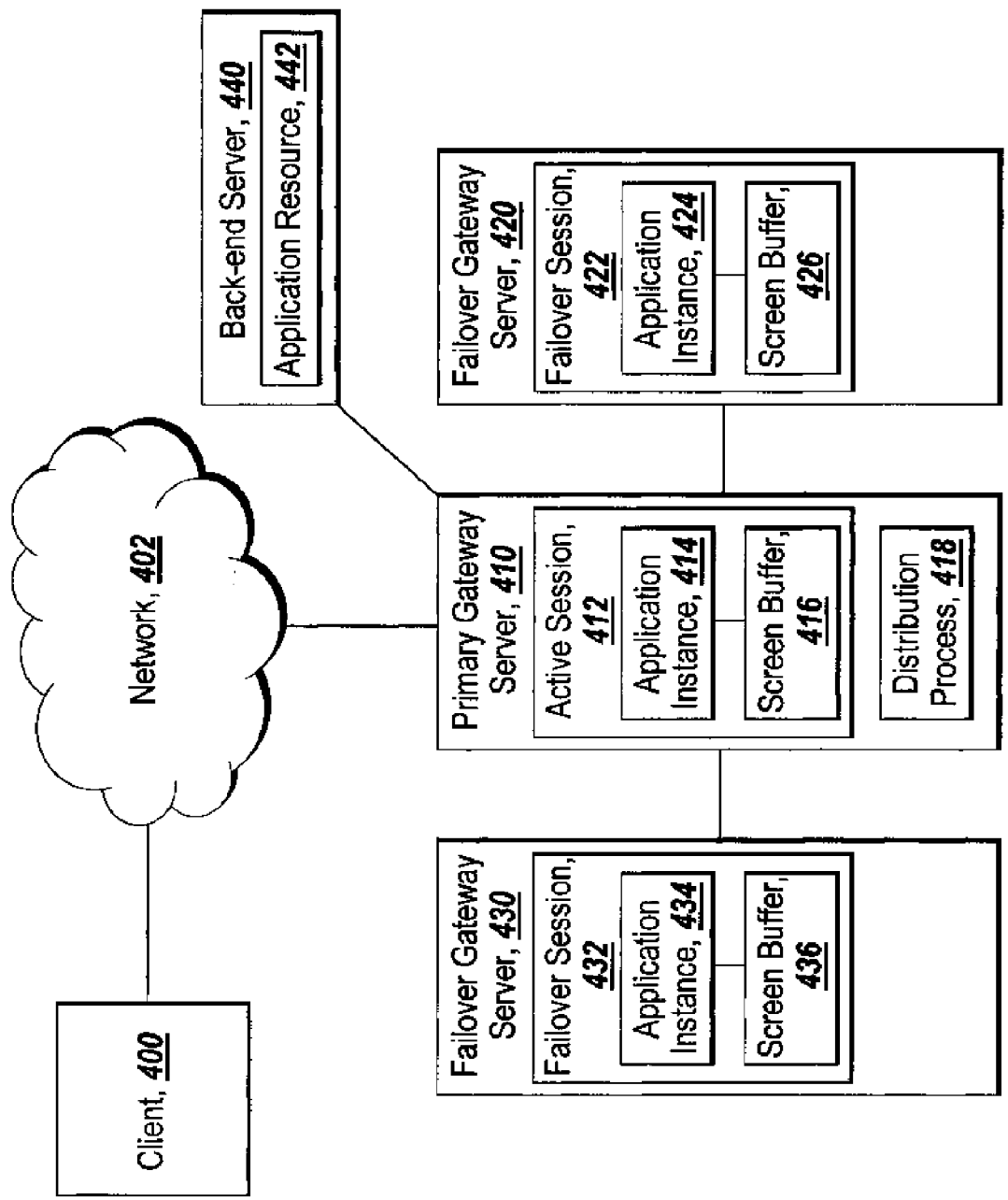
FIG. 5 depicts an alternate embodiment in which application screen buffers are kept synchronized for a remote session requested by a thin client or kiosk.

In another aspect of the illustrative embodiment, the present invention may also be implemented in a "thin-client" or kiosk architecture where all of the processing is taking place on the server and only screen data is being pushed down to the client 10 from the remote session 42. FIG. 5 depicts an alternate embodiment in which application screen buffers are kept synchronized for a remote session requested from a thin client or kiosk The client 400 may be a thin client with limited processing power such as a PDA or cell-phone or may be a publicly available kiosk terminal with a display and input device. The client establishes the remote session over the network 402 to a primary gateway server 410. The connection may be use RDP (Remote Display Protocol) from Microsoft Corporation or ICA from Citrix Systems, Inc. of Fort Lauderdale, Fla. The session may be established when the client 400 logs in via a secure web URL exposed by the primary gateway server. The primary gateway server accepts the connection request and establishes the remote active session 412. The illustrative embodiment also establishes failover sessions 422 and 432 on failover servers 420 and 430. The active session 412 and failover sessions 422 and 432 are similarly provisioned and include executing application instances 414, 424 and 434 respectively. Each of the application instances has an associated screen buffer 416, 426 and 436 respectively. A distribution process 418 on the primary gateway server copies and distributes input data received from the client 400 to each of the sessions 412, 422 and 432 in the manner set forth above. In an alternate implementation, the distribution process 418 may be located on a front end server. The application instances 414, 424 and 434 may request an application resource 442 from a back-end server 440 with the request from the primary gateway server being transmitted and the requests from the failover servers 420 and 430 being intercepted and discarded. As before, following the processing performed by the executing application instances 414, 424 and 434, a response to the client 400 is delayed until all of the screen buffers 416, 426 and 436 are in the same state. The contents (or changed contents when using optimization techniques) of the screen buffer 416 on the primary gateway server are then pushed down over the connection to the client 400. Attempts by the application instances 424 and 434 to push the contents of their screen buffers 426 and 436 to the client 400 are intercepted and the packets discarded.

The synchronization of session states performed by the present invention enables the transition of a remote session from a failed gateway server to a replacement gateway server without terminating a remote session and ensures a minimal loss of data. An agent 12 buffers a copy of the data sent from the client 10 (if a reliable protocol is being used such as TCP). The present invention does not return an acknowledgement of the receipt of data from the client until all of the session states have been synchronized. The agent 10 therefore buffers a copy of any sent data until the acknowledgement is received from the primary gateway server and then discards the data. In the event of any subsequent failure of the primary gateway server 40, the data sent by the client to the primary gateway server is present in one of the failover sessions. Similarly, the data received from the application resource is also distributed to both the active and failover sessions so that they remain synchronized. If an acknowledgement is not received from the primary gateway server, the buffered data is resent to the newly appointed primary gateway server.

Additionally, when the remote connection is initially established, the IP address assigned to the client 10 is distributed not just to the primary gateway server 40 which in one implementation is performing NAT for the client, but also to the failover servers 50, 60 and 70. When a failure of the primary gateway server 40 is detected, one of the failover servers 50, 60 or 70 is selected as the primary gateway server and its attributes are changed to allow it to perform that role. The filter 58, 68 or 78 present on the network stack that prevents the failover servers 50, 60 and 70 from communicating with the client 10 and application resource 82 is disabled for the newly designated primary gateway server. The newly selected primary gateway server also intercepts any communications received from the client or directed to the client using the previously sent IP address and the NAT table 56, 66 or 76 on the newly selected primary gateway. The combination of a mirrored session state and client IP awareness by the failover servers prior to the primary gateway server failing thus allows a smooth transition with minimal data loss and without the need to reestablish a new remote session.

The detection of a failure of the primary gateway server 40 may happen in a number of different ways. The method used to detect the server failure may be dependent upon the manner in which the servers are deployed. For example, the primary and gateway servers may be arranged as nodes in a clustered computer system. Nodes in a clustered computer system frequently send each other "heartbeat" signals (which are also referred to as "responsive" or "activation" signals) over private communication channels. The heartbeat signals/tokens indicate whether the nodes are active and responsive to other nodes in the clustered computer system. The heartbeat signals are sent periodically by each of the nodes so that if one or more nodes do not receive the heartbeat signal from another node within a specified period of time, a node failure can be suspected.

The final determination of a gateway server failure may be dictated by a failover policy controlling the gateway servers. The failover policy indicates under what circumstances the primary gateway server may be considered to have failed. For example, in the clustered computing system discussed above, in implementations which have multiple failover servers, the policy may require at least two failover servers to have not received the heartbeat token from the primary gateway server within the specified time period. Alternatively, the failover policy may require all of the failover nodes to have not received the heartbeat token from the primary gateway server. Those skilled in the art will recognize that a number of other techniques may be used alone or in combination to detect gateway server failure such as pinging the primary gateway server to determine its health. The pinging may be performed following the lack of the receipt of the heartbeat token in order to verify the failure of the primary gateway server.

Once a failure of the primary gateway server has been detected, a number of different methods of selecting a new primary gateway server from the failover servers may be employed. The server may be selected based on name or through a mathematical operation performed on a server identifier. Alternatively, the selection may be based on the server processing attributes (speed, memory, etc.) or the next primary gateway server may have been previously designated by a system administrator. Other possibilities will occur to those skilled in the art.

Figure 6:
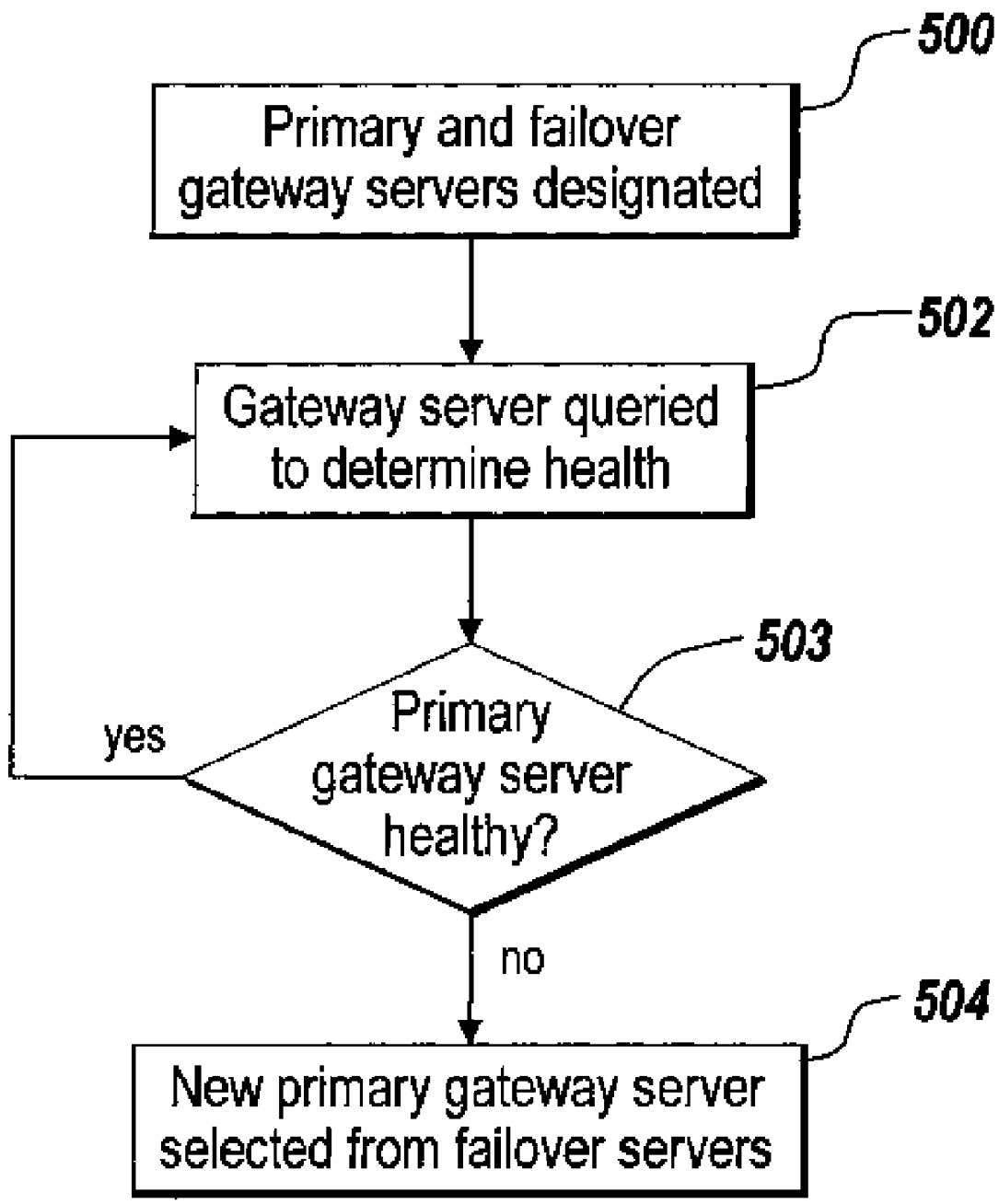
FIG. 6 is a flowchart of the sequence of steps followed by the illustrative embodiment to detect failure in a primary gateway server and transition to a new primary gateway server selected from the failover servers.

FIG. 6 depicts a sequence of steps followed by the present invention to handle primary gateway failures. The sequence begins with the primary and failover gateway servers being designated (step 500). The designation of the failover servers activates the filters on the network stack of those servers and disables the NAT tables. When a remote session is established, the IP address assigned to the client is forwarded to the failover servers. The primary gateway server is then queried to determine its health (step 502). If the primary gateway server is determined to be healthy (step 503), the query is repeated at set intervals. If the primary gateway server is not healthy (step 503), the new primary gateway server is selected from among the failover servers and its attributes changed so that its filter is disabled, it handles communications to and from the client IP and the NAT table on the server is activated (step 504).

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention. Similarly, data structures other than the ones mentioned herein may be used to hold data without departing from the scope of the present invention.

What is claimed as new and desired to be protected by Letters Patent of the United States is:

1. A method for providing failover redundancy of a gateway for a remote access solution between a client and a server, the method comprising:
   (a) executing, by a first gateway designated as a primary gateway between a client and a server, a first application instance for an active session of an application of the server;
   (b) executing, by a second gateway designated as a failover gateway between the client and the server, a second application instance for a failover session of the application;
   (c) forwarding, by a distribution process, input from a client to the first application instance and the second application instance;
   (d) initiating, by the first application instance in response to the input, a first request for an application resource from the server and initiating, by the second application instance in response to the input a second request for the application resource from the server;
   (e) forwarding, by the first gateway, the first request for the application resource from the first application instance to the server;
   (f) intercepting, by a filter of the second gateway, the second request for the application resource from the second application instance and discarding the second request instead of forwarding the second request to the server;
   (g) detecting a failure of the first gateway; and
   (h) disabling, on the second gateway, the filter in response to the detection.

2. The method of claim 1, wherein step (c) further comprises copying the input received from the client and forwarding the copied input to the second application instance so that the failover session in the second gateway is maintained in the same state as the active session on the first gateway.

3. The method of claim 1, wherein step (b) further comprises activating, by the second gateway, the filter on a network stack in response to designating the second gateway as the failover gateway.

4. The method of claim 1, wherein step (h) comprises selecting the second gateway to replace the first gateway as the primary gateway based on one of name, an operation performed on an identifier of a gateway, or processing attributes of a gateway.

5. The method of claim 1, wherein step (g) comprises detecting the failure in the first gateway via sending of periodic heartbeat signals.

6. The method of claim 1, wherein step (g) comprises determining the failure of the first gateway in accordance with a failover policy.

7. The method of claim 1, comprising forwarding to the second gateway an Internet Protocol address assigned to the client by the first gateway.

8. The method of claim 7, comprising performing, by the second gateway, network address translation for the Internet Protocol address of the client upon designation of the second gateway as the primary gateway.

9. The method of claim 1, comprising querying, by the distribution process, a state of the active session and the failover session to determine if session states are synchronized.

10. The method of claim 1, comprising receiving a response to the request for the application resource and forwarding, by the distribution process, the response to one of the first application instance or the second application instance.

11. The method of claim 10, comprising determining, by the distribution process, session states of the active session and the failover session are synchronized, and forwards the response to the client in response to the determination.

12. The method of claim 10, further comprising receiving a change in a screen buffer for the client in response to the request, the change in the screen buffer transmitted via one of a Remote Display Protocol (RDP), Remote Frame Buffer (RFB) protocol or an Independent Computing Architecture (ICA) protocol.

13. The method of claim 1, comprising, intercepting by the filter of the second gateway, responses from the second application instance of the failover session to the client.

14. A system for providing failover redundancy of a gateway for a remote access solution between a client and a server, the system comprising:
a first gateway designated as a primary gateway between a client and a server and executing on a first processor a first application instance for an active session of an application of the server;
a second gateway designated as a failover gateway between the client and the server and executing on a second processor a second application instance for a failover session of the application, the second gateway comprising a filter to intercept requests from the second application instance and discard the requests instead of forwarding the requests to the server; and
a distribution process forwarding input from a client to the first application instance and the second application instance and in response to the input, the first application instance initiating a first request for an application resource from the server and the second application instance initiating a second request for the application resource from the server, the first application instance forwarding the first request for the application resource from the first application instance to the server;
wherein upon detecting a failure of the first gateway, the second gateway disables the filter.

15. The system of claim 14, wherein one of the distribution process or the first gateway copies the input received from the client and forwards the copied input to the second application instance so that the failover session of the second gateway is maintained in the same state as the active session of the first gateway.

16. The system of claim 14, wherein the second gateway further comprises the filter on a network stack that is activated in response to designation of the second gateway as the failover gateway.

17. The system of claim 14, wherein the second gateway is selected to replace the first gateway as the primary gateway based on one of name, an operation performed on an identifier of a gateway, or processing attributes of a gateway.

18. The system of claim 14, wherein the second gateway detects the failure in the first gateway via sending of periodic heartbeat signals via a private communication channel.

19. The system of claim 14, wherein the second gateway comprises a failover policy for determining the failure of the first gateway in accordance.

20. The system of claim 14, wherein the first gateway forwards to the second gateway an Internet Protocol address assigned to the client by the first gateway.

21. The system of claim 14, wherein the distribution process queries state of the active session and the failover session to determine if session states are synchronized.

22. The system of claim 14, wherein the distribution process receives a response to the request for the application resource and forwards the response to one of the first application instance or the second application instance.

23. The system of claim 14, wherein the distribution process determines session states of the active session and the failover session are synchronized, and forwards the response to the client in response to the determination.

24. The system of claim 22, wherein the response comprises a change in a screen buffer for the client in response to the request, the change in the screen buffer comprising one of a Remote Display Protocol (RDP), Remote Frame Buffer (RFB) protocol or an Independent Computing Architecture (ICA) protocol.

25. The system of claim 14, wherein the filter intercepts responses sent from the second application instance to the client.

26. A method for providing failover redundancy of a gateway for a remote access solution between a client and a server, the method comprising:
(a) executing, by a first gateway designated as a primary gateway between a client and a server, a first application instance for an active session of an application of the server;
(b) executing, by a second gateway designated as a failover gateway between the client and the server, a second application instance for a failover session of the application;
(c) forwarding, by a distribution process, input from a client to the first application instance and the second application instance;
(d) initiating, by the first application instance in response to the input, a first request for an application resource from the server and initiating, by the second application instance in response to the input, a second request for the application resource from the server;
(e) forwarding, by the first gateway, the first request for the application resource from the first application instance to the server;
(f) intercepting, by a filter of the second gateway, the second request for the application resource from the second application instance and discarding the second request instead of forwarding the second request to the server;

(g) receiving, by the distribution process, the application resource from the server in response to the first request;

(h) forwarding, by the distribution process, the application resource to the first application instance and the second application instance;

(i) detecting a failure of the first gateway; and (j) disabling, on the second gateway, the filter in response to the detection, the second application instance forwarding requests from the second application instance to the server in response to the disabled filter.

* * * * *

UNITED STATES PATENT AND TRADEMARK OFFICE
CERTIFICATE OF CORRECTION

PATENT NO. : 7,657,657 B2 Page 1 of 1
APPLICATION NO. : 11/161656
DATED : February 2, 2010
INVENTOR(S) : Rao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1035 days.

Signed and Sealed this

Thirtieth Day of November, 2010

David J. Kappos
*Director of the United States Patent and Trademark Office*